(12) United States Patent
Wroblewski et al.

(10) Patent No.: US 9,333,879 B2
(45) Date of Patent: May 10, 2016

(54) SLIDING PIN TYPE FLOOR LATCH

(71) Applicant: LEAR CORPORATION, Southfield, MI (US)

(72) Inventors: Krzysztof Wroblewski, Washington, MI (US); Stanislaw Andrzej Wieclawski, Hohenkammer (DE)

(73) Assignee: LEAR CORPORATION, Southfield, MI (US)

( * ) Notice: Subject to any disclaimer, the term of this patent is extended or adjusted under 35 U.S.C. 154(b) by 260 days.

(21) Appl. No.: 13/943,682

(22) Filed: Jul. 16, 2013

(65) Prior Publication Data

US 2014/0056639 A1 Feb. 27, 2014

(30) Foreign Application Priority Data

Aug. 23, 2012 (DE) .......................... 10 2012 215 015

(51) Int. Cl.
*E05C 5/02* (2006.01)
*B60N 2/015* (2006.01)
*B60N 2/30* (2006.01)

(52) U.S. Cl.
CPC .......... *B60N 2/01516* (2013.01); *B60N 2/0155* (2013.01); *B60N 2/01583* (2013.01); *B60N 2/305* (2013.01); *B60N 2/3011* (2013.01); *Y10T 403/602* (2015.01)

(58) Field of Classification Search
USPC .......... 292/57, 44, 58, 60, 149, 155; 251/229, 251/267
See application file for complete search history.

(56) References Cited

U.S. PATENT DOCUMENTS

| 1,907,625 | A | * | 5/1933 | Vogt | ..................... E05B 65/0864 |
| | | | | | 292/140 |
| 2,098,249 | A | * | 11/1937 | Kistner | ................... E05B 35/00 |
| | | | | | 70/100 |
| 2,978,266 | A | * | 4/1961 | Poe | ....................... E05B 63/125 |
| | | | | | 292/57 |
| 3,606,801 | A | | 9/1971 | Williams | |
| 6,773,068 | B2 | | 8/2004 | Shinozaki | |
| 6,860,562 | B2 | | 3/2005 | Bonk | |

(Continued)

FOREIGN PATENT DOCUMENTS

| CN | 1600599 A | 3/2005 |
| CN | 101746294 A | 6/2010 |

(Continued)

OTHER PUBLICATIONS

Chinese Office Action dated Jul. 3, 2015 (Chinese Appn. No. 201310311254.0 filed Jul. 23, 2013), 5 pgs.

*Primary Examiner* — Mark Williams
(74) *Attorney, Agent, or Firm* — Brooks Kushman P.C.

(57) ABSTRACT

A latching system for a vehicle seat includes a latching component mountable on a vehicle seat component and a striker mountable on a vehicle structural component. The latching component includes a housing for mounting the latching component, a first bushing attached to the housing, the first bushing having a first guiding groove system, a second bushing having a second guiding groove system, the second bushing positioned over the first bushing, and a latch pin. The striker has a slot for engaging the latch pin. The latch pin includes a guide pin that is positioned within the second bushing such that the guide pin is positioned within the first guiding groove system and the second guiding groove system. Rotation of the outer bushing causes movement of the latch pin between an extended position and a retracted position via motion of the guide pin which engages a slot.

11 Claims, 14 Drawing Sheets

(56) References Cited

U.S. PATENT DOCUMENTS

| | | |
|---|---|---|
| 6,932,409 B2 | 8/2005 | Falchero et al. |
| 6,981,744 B2 | 1/2006 | Elterman et al. |
| 7,011,370 B2 | 3/2006 | Jeong |
| 7,073,862 B2 | 7/2006 | Lavoie |
| 7,270,375 B2 | 9/2007 | Lutzka et al. |
| 7,575,280 B2 | 8/2009 | Palomba et al. |
| 7,891,720 B2 | 2/2011 | Jeong et al. |
| 7,954,873 B2 | 6/2011 | Abe et al. |
| 8,109,577 B2 | 2/2012 | Shao |
| 2003/0025373 A1 | 2/2003 | Shinozaki |
| 2003/0107232 A1 | 6/2003 | Demptos et al. |
| 2005/0023857 A1 | 2/2005 | Lavoie |
| 2005/0253407 A1 | 11/2005 | Lutzka et al. |
| 2007/0152484 A1 | 7/2007 | Palomba et al. |
| 2009/0021064 A1 | 1/2009 | Shao |
| 2010/0052334 A1* | 3/2010 | Hart .............. A61G 5/1075 292/4 |

FOREIGN PATENT DOCUMENTS

| | | |
|---|---|---|
| DE | 102004053033 B3 | 12/2005 |
| DE | 102005053033 | 12/2005 |
| DE | 102007001082 | 7/2007 |

\* cited by examiner

SLIDING PIN TYPE FLOOR LATCH

CROSS-REFERENCE TO RELATED APPLICATIONS

This application claims priority to DE 10 2012 215 015.3 filed 23 Aug. 2012, the disclosure of which is hereby incorporated by reference in its entirety.

TECHNICAL FIELD

In at least one aspect, the present invention relates to latching systems for vehicle seats.

BACKGROUND

Latching systems are used in vehicle seats to hold the seat securely to the vehicle. Some prior art latching systems utilize a hook to secure a seat to a vehicle floor. Such systems provide some difficulty in latching and tend to have strength issues.

Accordingly, there is a need for an improved latching system for holding a vehicle seat securely to a vehicle floor.

SUMMARY OF THE INVENTION

The present invention solves one or more problems of the prior art by providing in at least one embodiment a latching system for a vehicle seat. The latching system includes a latching component mountable on a vehicle seat component and a striker mountable on a vehicle structural component. The latching component includes a housing for mounting the latching component, a first bushing attached to the housing, the first bushing having a first guiding groove system, a second bushing having a second guiding groove system, the second bushing positioned over the first bushing, and a latch pin. The striker has a slot for engaging the latch pin. The latch pin includes a guide pin that is positioned within the second bushing such that the guide pin is positioned within the first guiding groove system and the second guiding groove system. Rotation of the outer bushing causes movement of the latch pin between an extended position and a retracted position via motion of the guide pin. The latch pin engages the slot of the striker at the extended position. The latching component also includes a torsion spring that biases the latch pin to the extended position. Advantageously, the latching system of the present embodiment provides a hidden latch mechanism in which the striker can be installed on tracks that are capable of interlocking with recliners. Moreover, the present embodiment provides double shear loading for greater strength.

In another embodiment, a vehicle seat incorporating the latching system set forth above is also provided. The vehicle seat includes a seat bottom, a seat top rotatably mounted to the seat bottom, and a latching system attached to the seat bottom. The latching system includes a latching component mountable on a vehicle seat component and a striker mountable on a vehicle structural component. The latching component includes a housing for mounting the latching component, a first bushing attached to the housing, the first bushing having a first guiding groove system, a second bushing having a second guiding groove system, the second bushing positioned over the first bushing, and a latch pin. The striker has a slot for engaging the latch pin. The latch pin includes a guide pin that is positioned within the second bushing such that the guide pin is positioned within the first guiding groove system and the second guiding groove system. Rotation of the outer bushing causes movement of the latch pin between an extended position and a retracted position via motion of the guide pin. The latch pin engages the slot of the striker at the extended position. The latching component also includes a torsion spring that biases the latch pin to the extended position.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
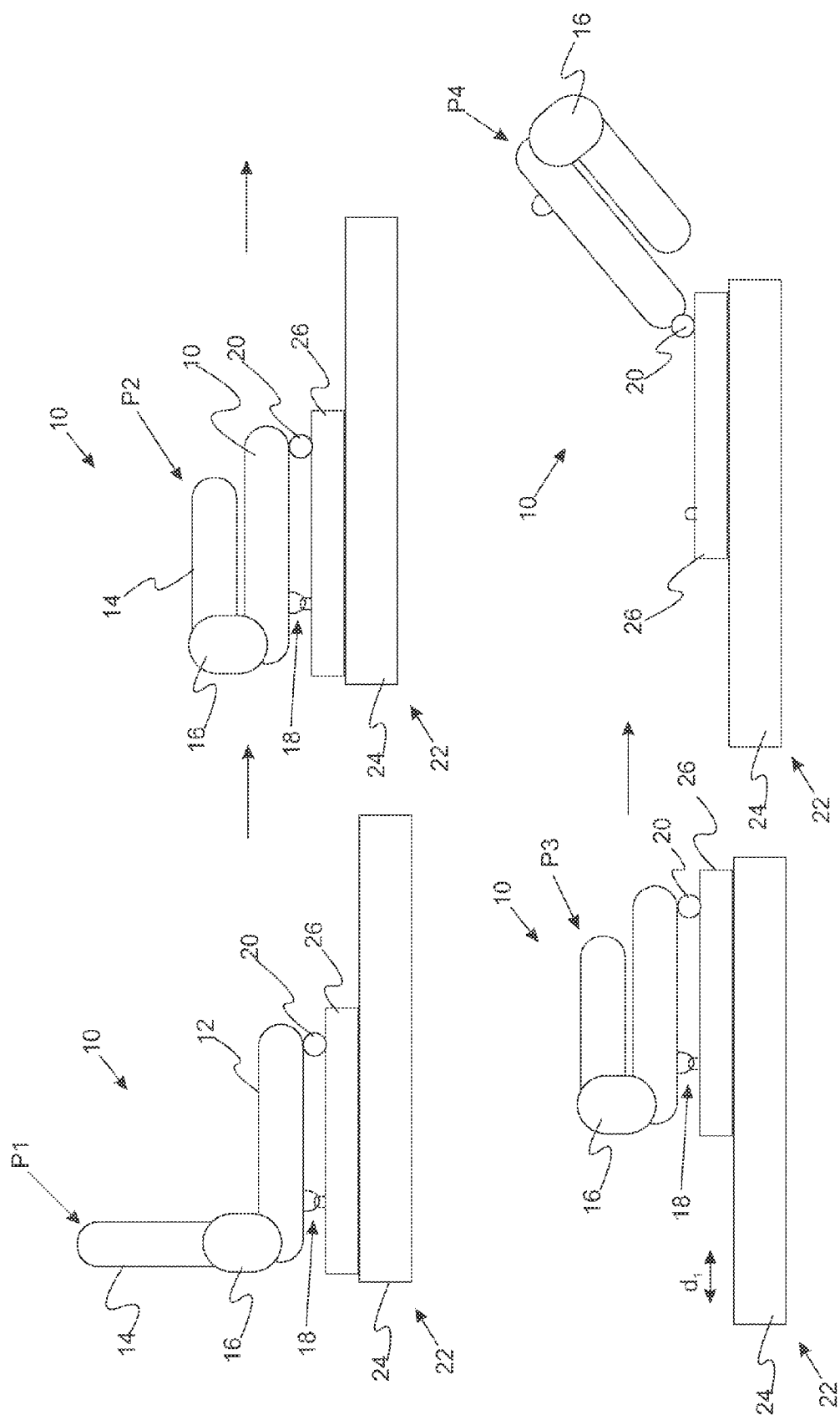
FIG. 1 is a schematic illustration illustrating the operation of a vehicle seat having a latching system.

With reference to FIG. 1, a vehicle seat having a latching system is provided. Vehicle seat 10 includes seat bottom 12 and seat top 14 rotatably mounted to the seat bottom via rotation bracket 16. Vehicle seat 10 also includes latching system 18 attached to the seat bottom 12. The details of latching system 18 are set forth below. Seat back 12 rotates from upright position P1 to folded position P2. Moreover, seat 10 is positionable from latch position P3 to folded back position P4 via rotation system 20 to provide storage space in a vehicle if necessary by unlatching latching system 18. In a refinement, track system 22 includes rails 24 and 26 which allow sliding of vehicle seat 10 along direction $d_1$.

Figure 2:
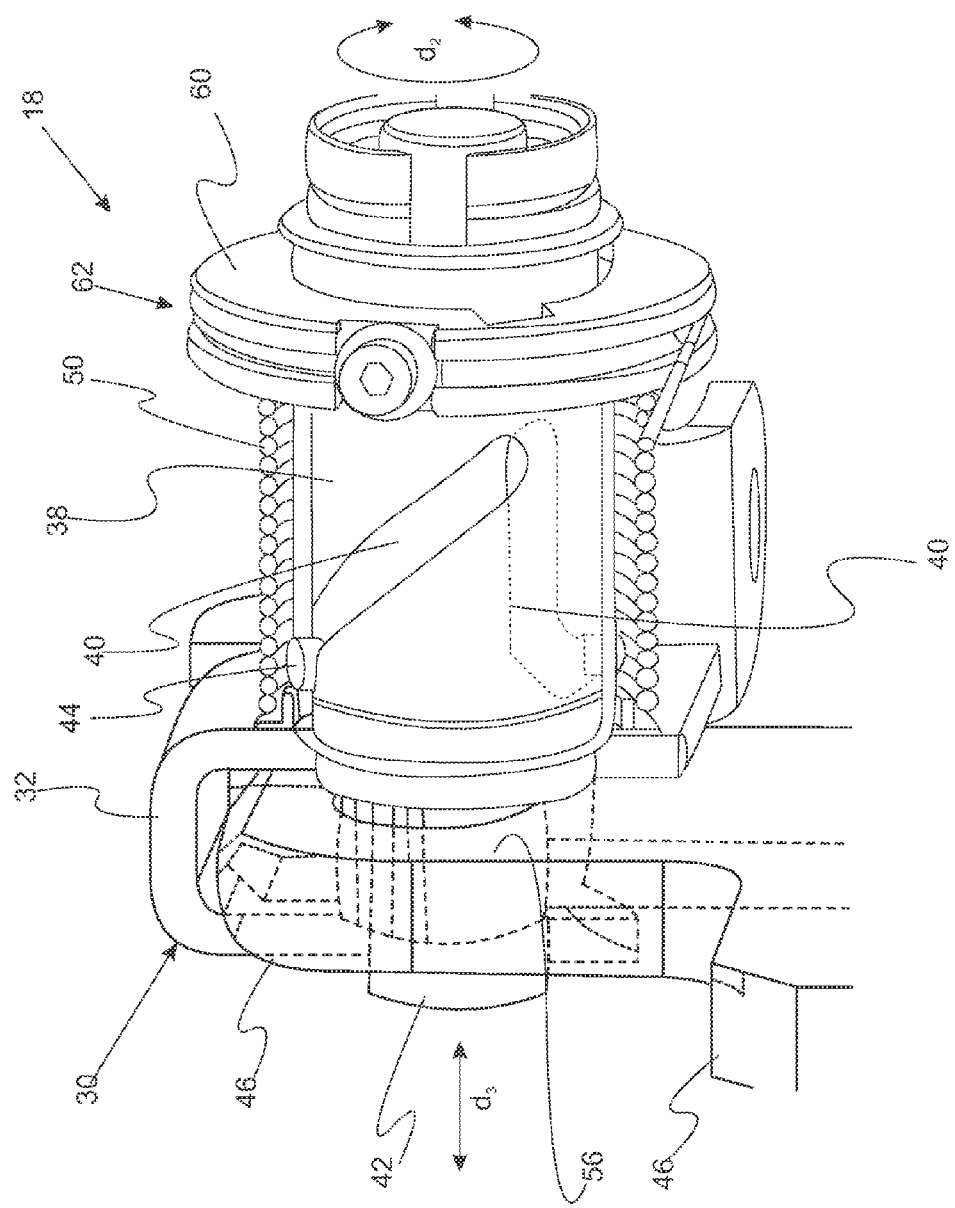
FIG. 2 is a perspective view of the latching system with a portion of the torsion spring cut away.
Figure 3:
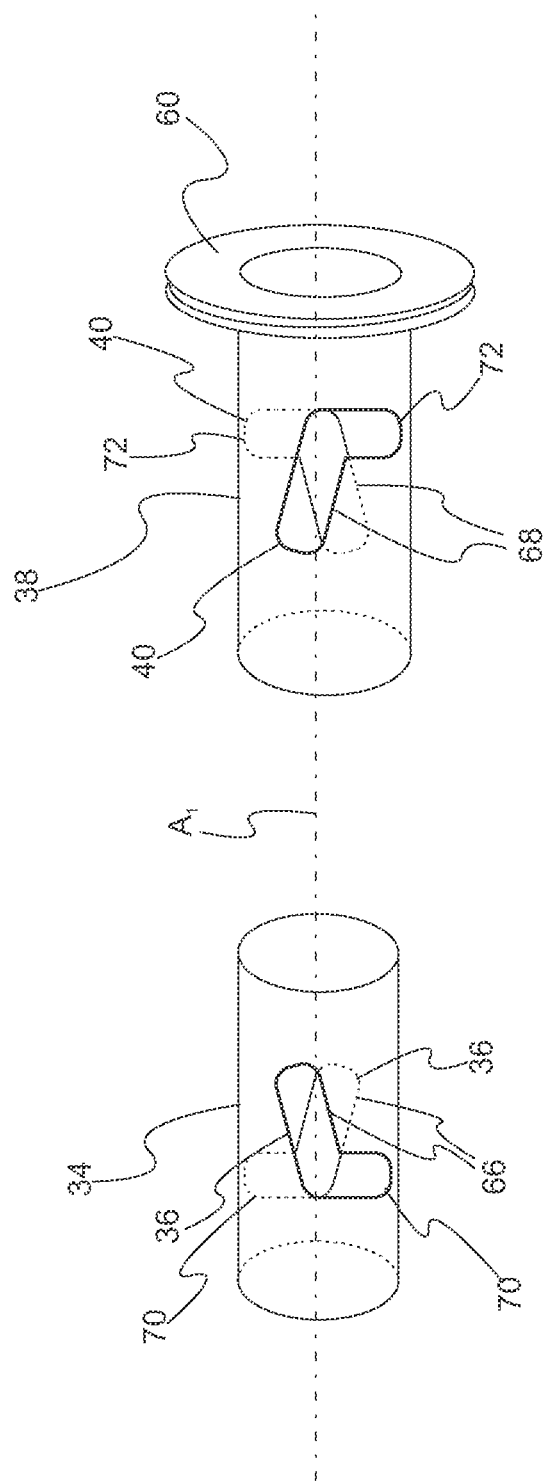
FIG. 3 provides a schematic illustration of two bushings used in the latching system.

With reference to FIGS. 2 and 3, details of latching system 18 are provided. FIG. 2 is a perspective view of the latching system with a portion of the torsion spring cut away. FIG. 3 provides a schematic illustration of two bushings used in the latching system. Latching system 18 includes latching component 30 mountable on the seat bottom 12. Latching component 30 includes housing 32 for mounting latching component 30 on seat bottom 12 (FIG. 1). First bushing 34 is attached to housing 32. First bushing 34 defines first guiding groove system 36. Latching system 18 also includes second bushing 38 which defines a second guiding groove system 40. Second bushing 38 is positioned over first bushing 34. Latch pin 42 is a shaft that includes guide pin 44. Latch pin 42 is positioned within the first bushing 34 with guide pin 42 positioned within first guiding groove system 36 and second guiding groove system 40. Rotation of the first bushing along direction $d_2$ causes movement of latch pin 42 between an extended position and a refracted position along direction $d_3$ as guide pin 44 is forced to move via the motion of second guiding groove system 40 relative to first guiding groove system 36. FIG. 2 shows latch pin 42 in the extended position engaging striker 46. Torsion spring 50 biases latch pin 42 to the extended position. Torsion spring 50 has a first spring end fixed relative to first bushing 34 and a second end fixed to second bushing 38. Additional details regarding the torsion spring are set forth below. Striker 46 is mountable on a support base and includes slot 56 for engaging latch pin 42.

Still referring to FIGS. 2 and 3, second bushing 38 includes guide flange section 60 which defines guide groove 62. Guide groove 62 receives an actuating cable which is user operated to disengage latch pin 42 from striker 46. Although the present variation positions guide flange section 60 distant from housing 32, variations set forth below position guide flange section 60 proximate to housing 32.

Still referring to FIGS. 2 and 3, the first guiding groove system 36 and the second guiding groove system 40 each independently have a first pair of diagonal groove sections angled with a first angle with respect to a rotation axis for second bushing 38. Specifically, first guiding groove system 36 includes diagonal groove section 66 which has an angle of 0 to 50 degrees with respect to a rotation axis $A_1$ for second bushing 38 (or first bushing 34). Second guiding groove system 40 includes diagonal groove section 68 which has an angle of 0 to 50 degrees with respect to a rotation axis for second bushing 38. In a refinement, first guiding groove system 36 and second guiding groove system 40 each independently have a second pair of diagonal groove sections angled with a second angle with respect to the rotation axis for second bushing 38. Specifically, first guiding groove system 36 includes diagonal groove section 70 which has an angle of 70 to 90 degrees with respect to a rotation axis for second bushing 38 (or first bushing 34). Second guiding groove system 40 includes diagonal groove section 72 which has an angle of 70 to 90 degrees with respect to a rotation axis for second bushing 38.

Figure 4:
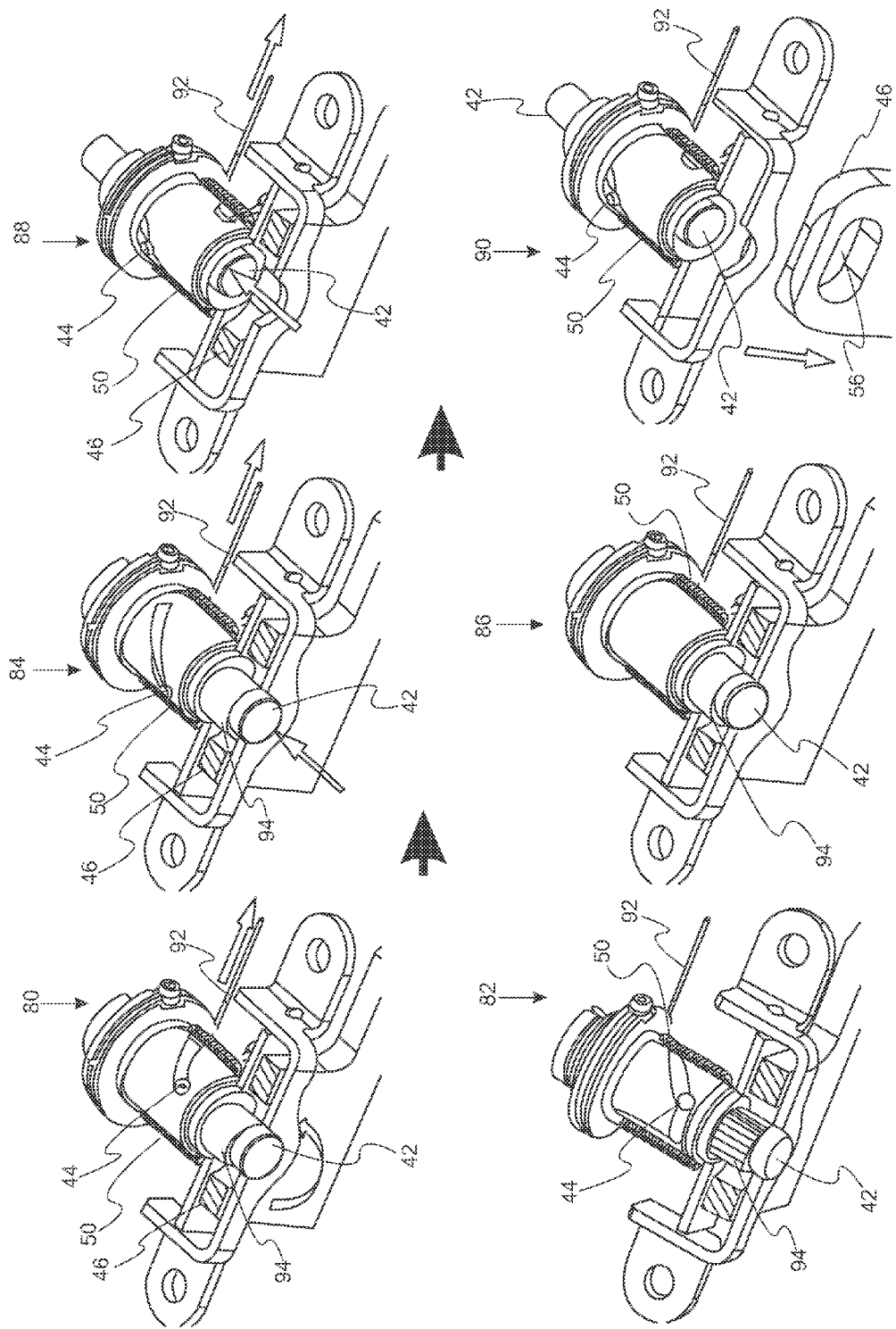
FIG. 4 is a sequence of perspective views demonstrating the operation of the latching position from a latched to open position.

With reference to FIG. 4, a sequence of perspective views demonstrating the operation of the latching position from a latched to open position is provided. The sequence of activation is provided by item numbers 80 to 90. At item numbers 80 and 82, latching system 18 is in the engaged position when a user pulls actuator cable 92. Moreover, latch pin 42 is in the extended position. At item numbers 84 and 86, latch pin 42 starts sliding out of engagement to release striker 46. However, at this point latch pin 42 is engaged but not rotated on cam section 94. At item numbers 88 and 90, the user keeps pulling actuator cable 92 such that latch pin 42 is disengaged and striker 46 is ready to move out of latch housing 32. At this point, latch pin 42 is in the refracted position.

Figure 5:
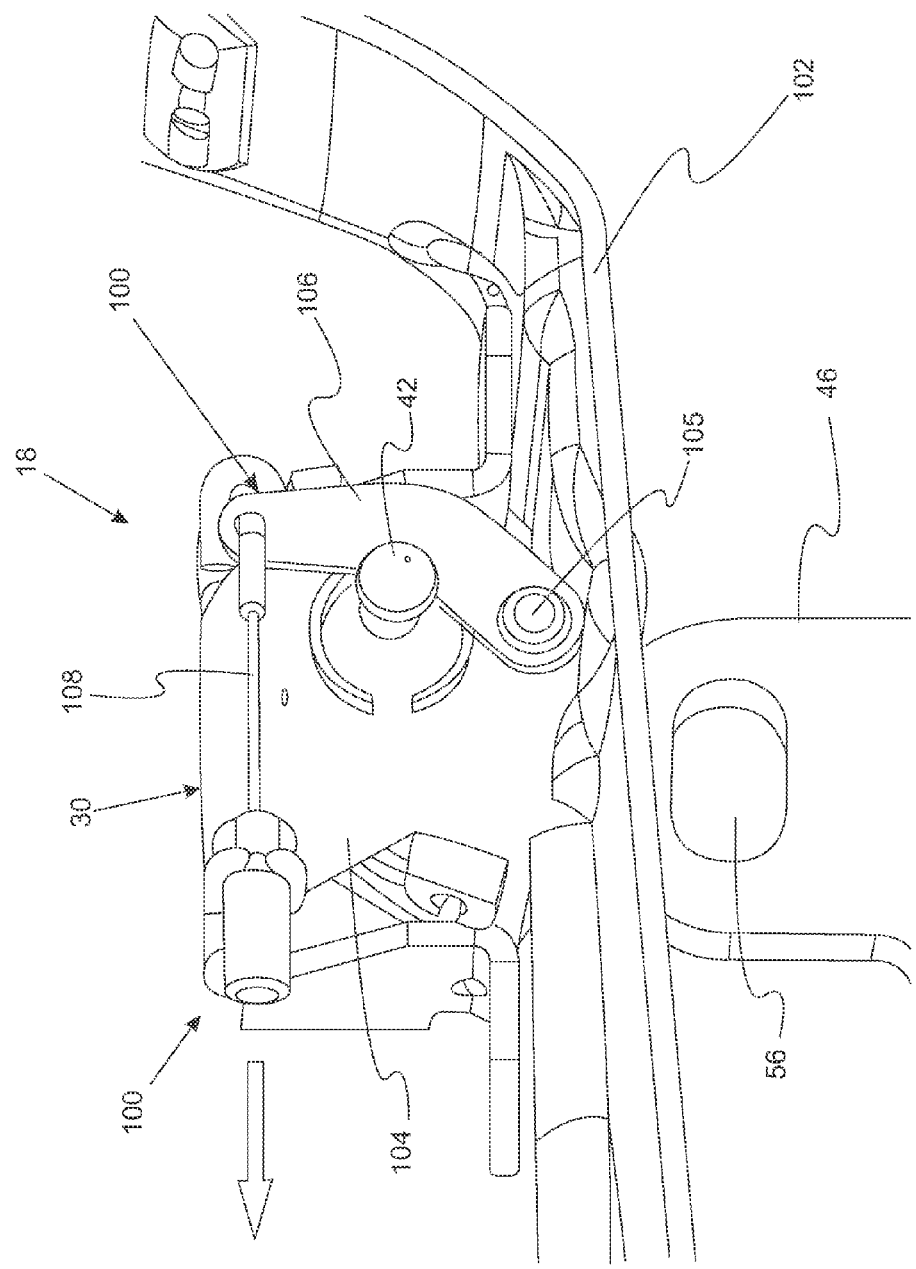
FIG. 5 is a perspective view of the latching system of FIG. 2 including a stop component.

With reference to FIG. 5, a perspective view of a latching system including a stop component is provided. In this variation, latching system 18 includes stop component 100. Latching component 30 is mounted on seat structural component 102. Stop component 100 includes mounting bracket 104 attached to second bushing 38. Arm 106 is rotatably attached to mounting bracket 104 at pivot point 105. Recliner cable 108 is attached to the arm 106 so when latch pin 42 is in the extended position engaging striker 46 (FIG. 2), actuation of the recliner cable allows positioning of the seat back in the reclined position. Arm 106 contacts latch pin 42 when the latch pin is in the retracted position thereby preventing actuation of a vehicle seat to a reclined position. FIG. 5 depicts arm 106 in this latter position with latch pin 42 extending away from housing 32 (FIG. 2).

Figure 6:
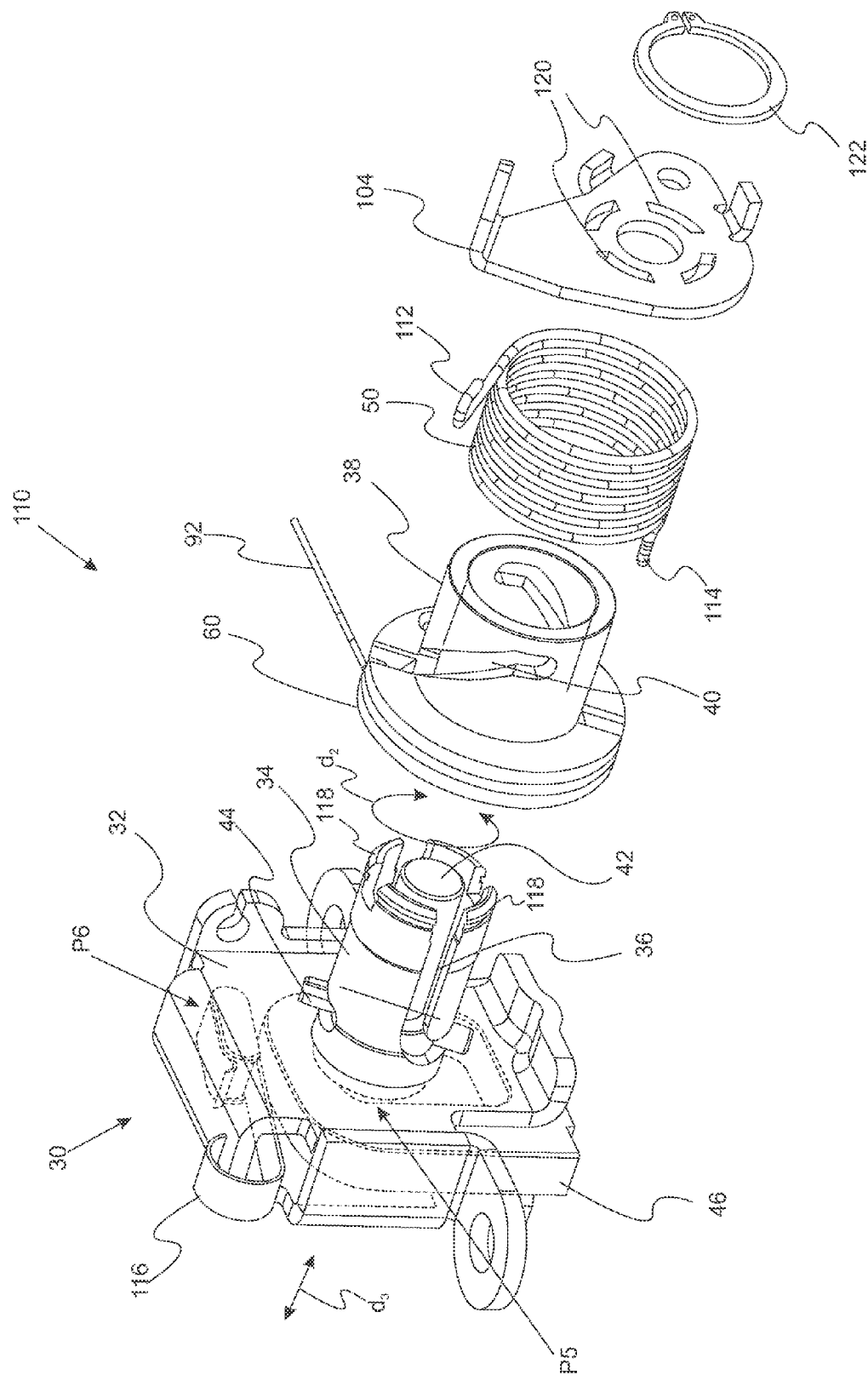
FIG. 6 is a partially exploded view of a latching system with a blocking component in the unblocked position.
Figure 7:
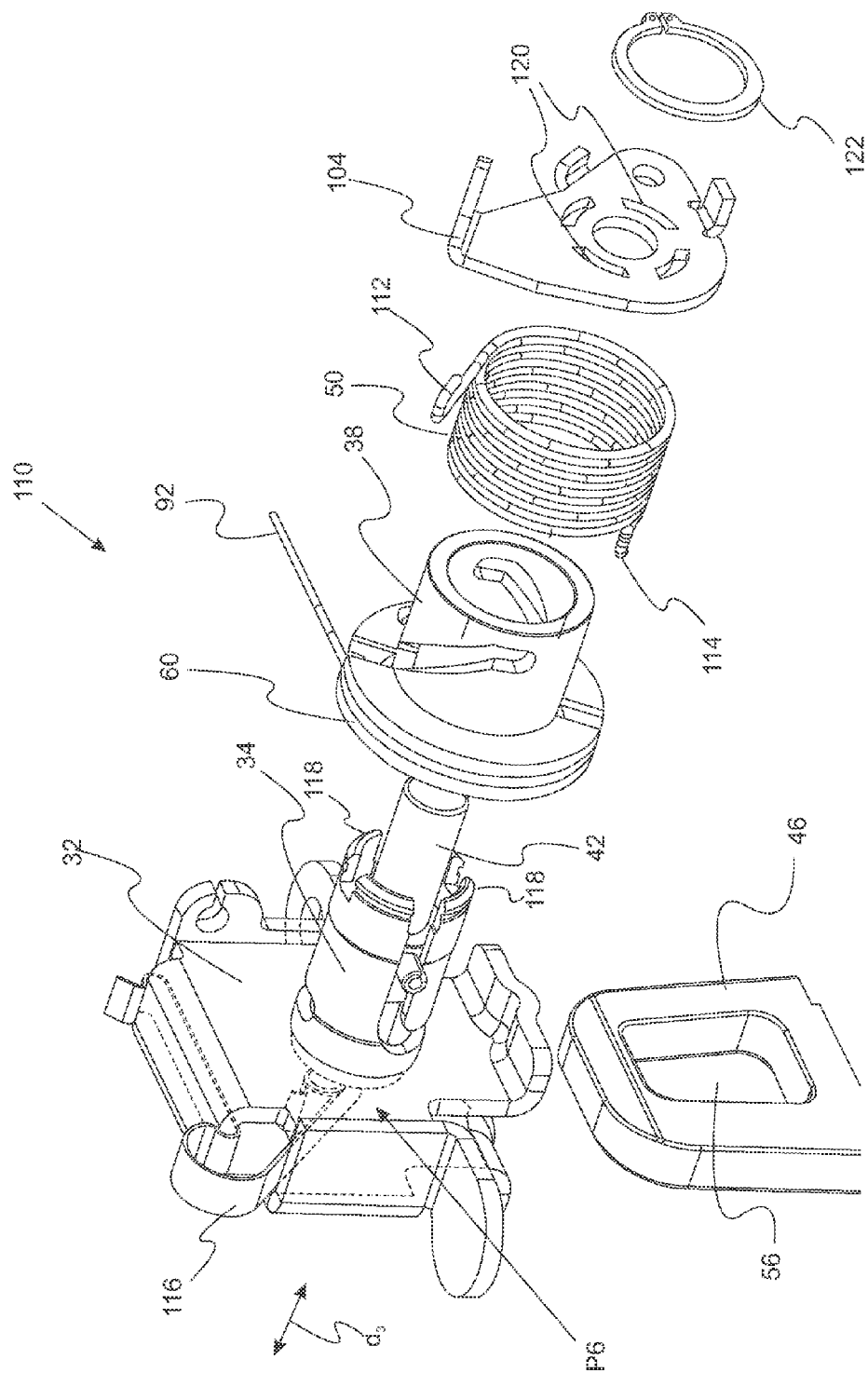
FIG. 7 is a partially exploded view of a latching system with a blocking component in the blocked position.

With reference to FIGS. 6 and 7, a variation of the latching system illustrating several additional features is provided. FIG. 6 is a partially exploded view of a latching system with a blocking component in the unblocked position. FIG. 7 is a partially exploded view of a latching system with a blocking component in the blocked position. The details of FIGS. 1-5 apply to this variation except as noted. As set forth above with respect to the descriptions of FIGS. 2-5, latching system 110 includes latching component 30 mountable on the seat bottom 12 (FIG. 1). Latching component 30 includes housing 32 for mounting latching component 30 on seat bottom 12 (FIG.

1). First bushing 34 is attached to housing 32. First bushing 34 defines first guiding groove system 36. Latching system 110 also includes second bushing 38 which defines a second guiding groove system 40. Second bushing 38 is positioned over first bushing 34. Latch pin 42 is a shaft that includes guide pin 44. Latch pin 42 is positioned within the first bushing 34 with guide pin 44 positioned within first guiding groove system 36 and second guiding groove system 40. The details of first guiding groove system 36 and second guiding groove system 40 are set forth above with respect to the description of FIG. 5. Rotation of first bushing 34 along direction $d_2$ causes movement of latch pin 42 between the extended position (FIG. 6) and the refracted position (FIG. 7) along direction $d_3$ as guide pin 44 is forced to move via the motion of second guiding groove system 40 relative to first guiding groove system 36. Latch pin 42 engages striker 46 at the extended position P5. Torsion spring 50 biases latch pin 42 to extended position P5. Torsion spring 50 has a first spring end 112 fixed relative to first bushing 34 and a second end 114 fixed to second bushing 38. Striker 46 is mountable on a support base and includes slot 56 for engaging latch pin 42.

Figure 8:
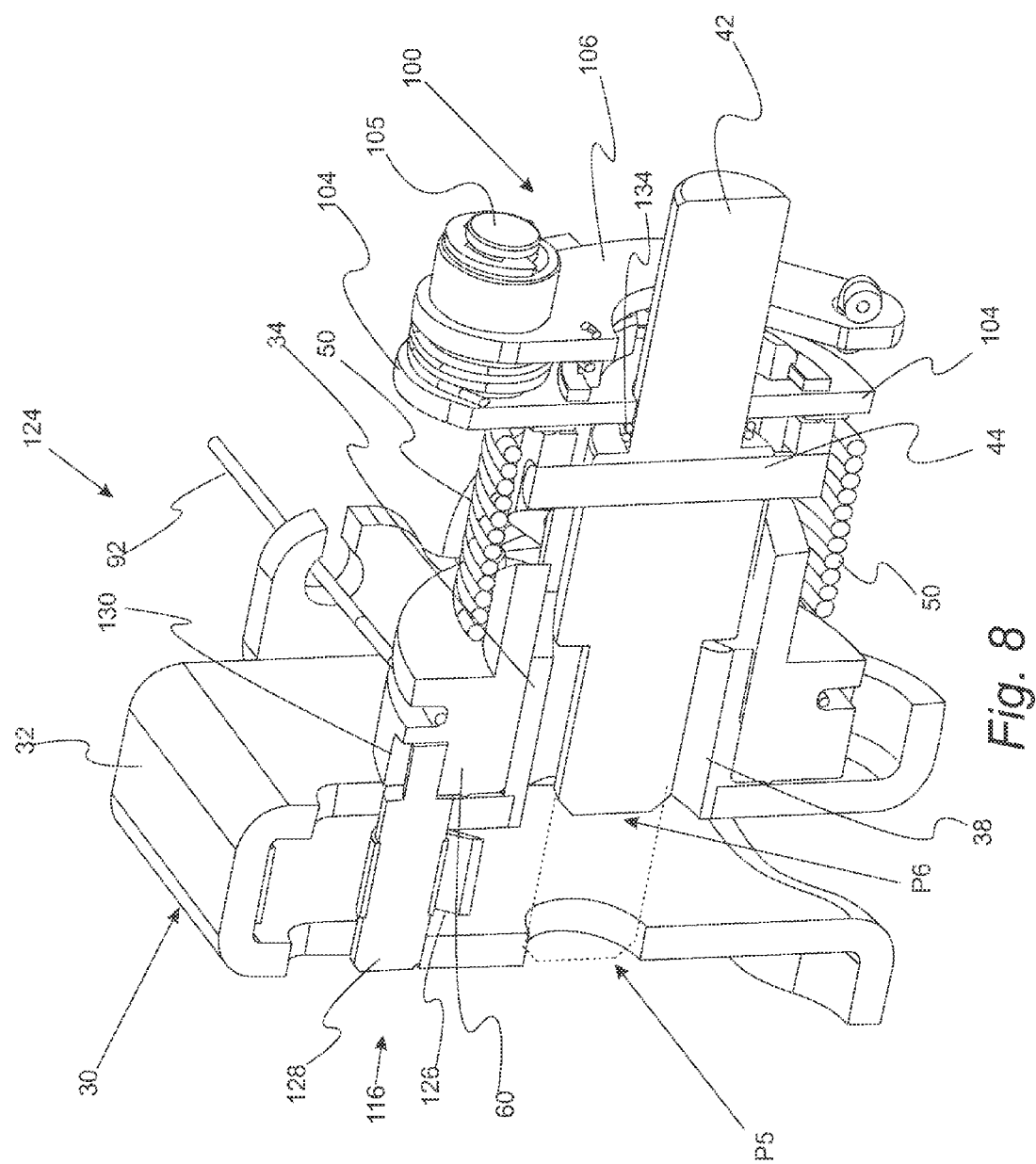
FIG. 8 is a partial cross section of a latching system with a blocking component.

Still referring to FIGS. 6 and 7, latching system 110 further includes blocking component 116 which is positionable in a blocking position (FIG. 7) that blocks latch pin 42 from moving to extended position P5 thereby holding latch pin 42 at retracted position P6. Blocking component 116 is also positionable at a retracted position (FIG. 6) that allows latch pin 42 to move to extended position P5. Blocking component 116 is moved from the blocking position to the retracted position by engagement with striker 46. In the variation of FIGS. 6, 7, and 8, blocking component 116 is a flat spring attached to housing 32. FIGS. 6 and 7 also depict stop component 100 which is configured as set forth above in FIG. 5. However, in this variation first bushing 34 includes protrusions 118 that attach bracket 104 to first bushing 34 via slots 120. Washer 122 holds bracket 104 in place.

Figure 9:
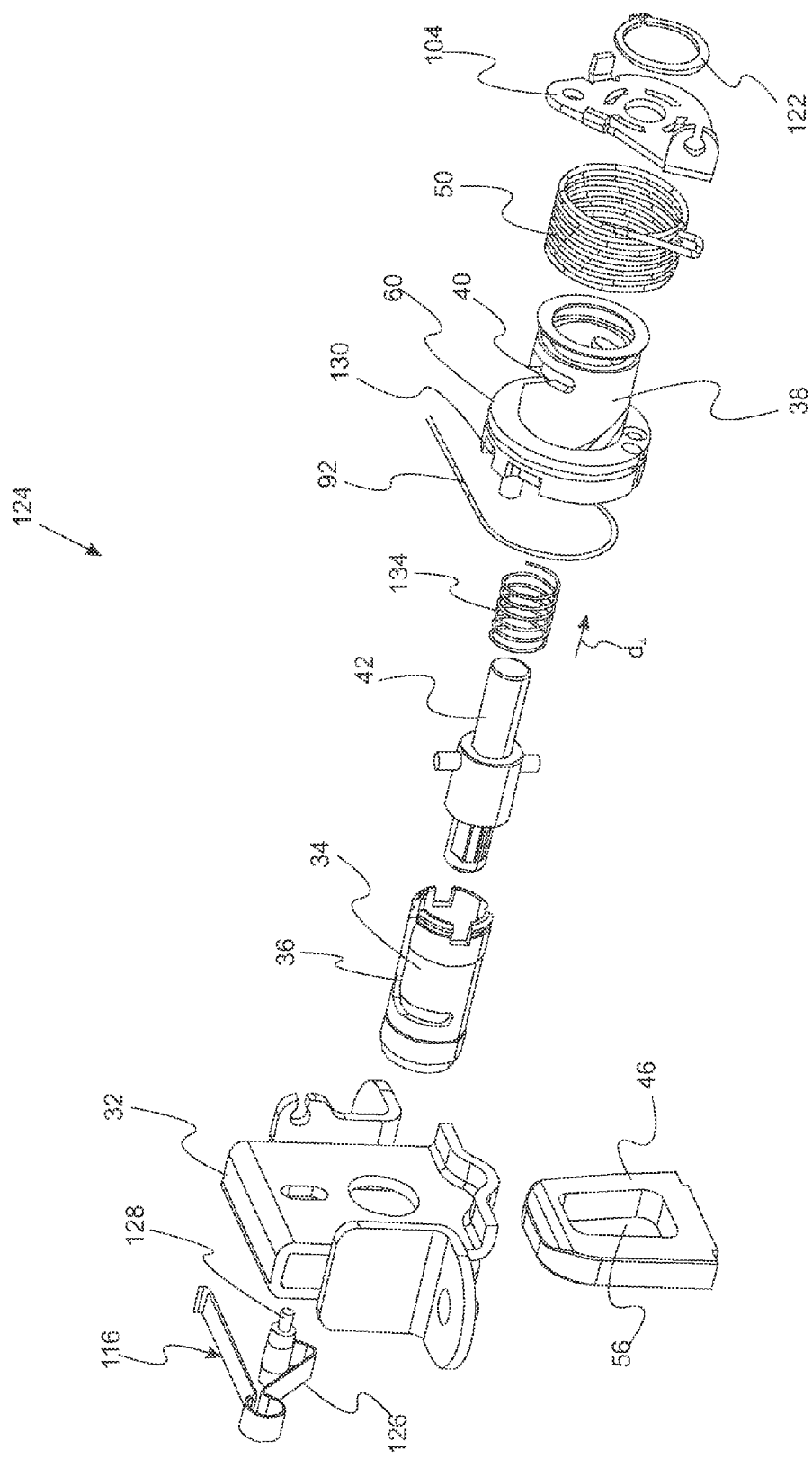
FIG. 9 is an exploded view of a latching system with a variation of the blocking component.
Figure 10:
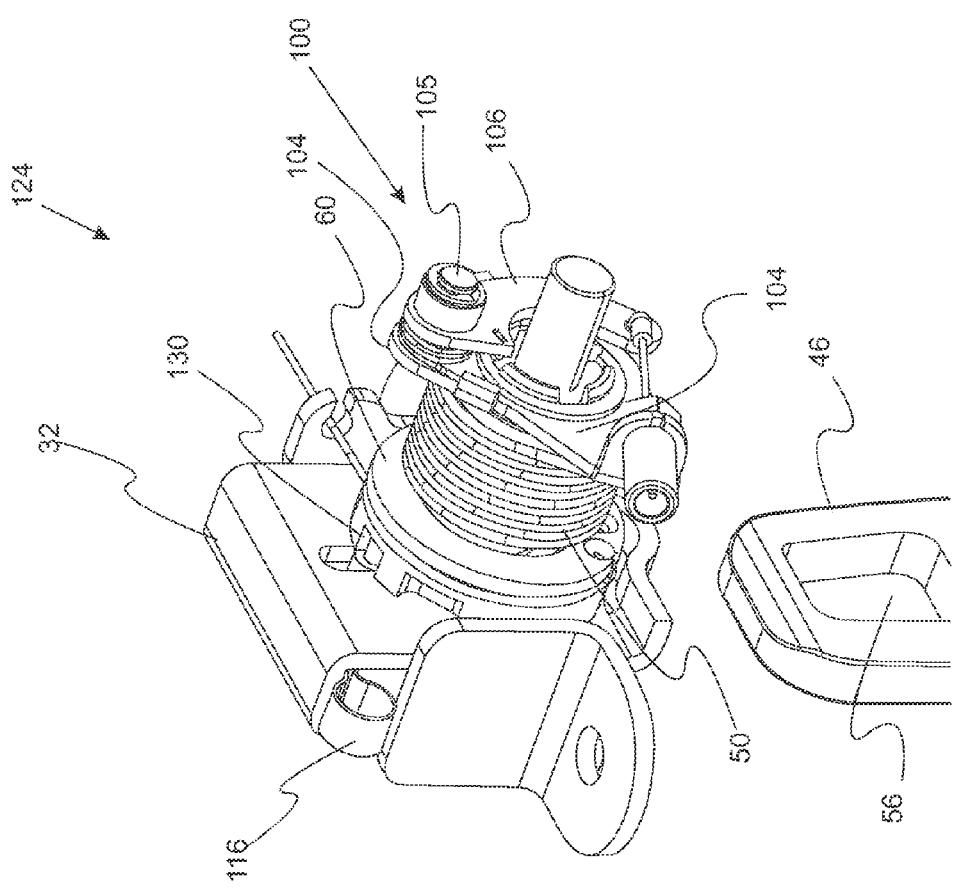
FIG. 10 is a perspective view of a latching system with the blocking component of FIG. 9.

With reference to FIGS. 8, 9 and 10, a variation of the latching system with a blocking component is provided. FIG. 8 is a partial cross section of a latching system with a blocking component. FIG. 9 is an exploded view of a latching system with a blocking component. FIG. 10 is a perspective view of a latching system with a blocking component. The details of FIGS. 1-7 apply to this variation except as noted. In this variation, latching system 124 includes blocking component 116. Blocking component 116 includes a flat spring 126 and a blocking pin 128 attached to the flat spring. Guide flange section 60 defines at least one notch 130 that engages the blocking pin 128 when the latch pin is in the refracted position. Such engagement holds second bushing 38 in place until engagement with striker 46 which pushes blocking pin 128 out of notch 130. In this variation, flat spring 126 has one end attached to housing 32 and another end attached to blocking pin 128 as set forth above. In another refinement, latching system 124 includes adjustment spring 134 which allows for adjustment of latch pin 42 should the shaft make an improper contact with striker 46. For example, if striker 46 is not completely positioned for engagement, latch pin 42 might strike the top of striker 46. In this event, adjustment spring 134 allows for the flexibility of latch pin 42 to back off along direction $d_4$. Additional details regarding adjustment spring 134 are set forth below.

Figure 11A:
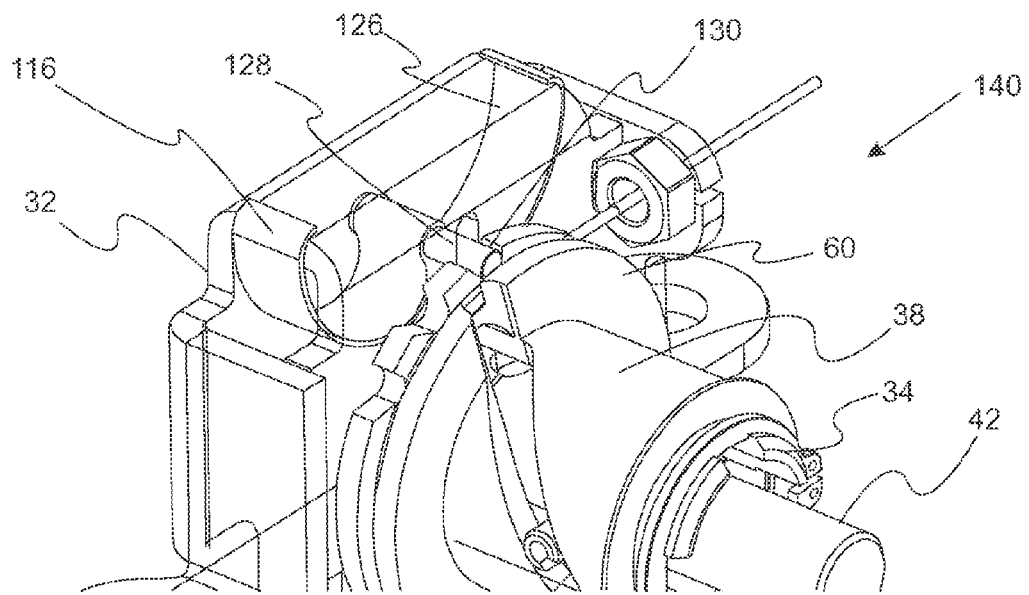
FIG. 11A is a perspective view of a latching system with another variation of the blocking component in the unblocked position.
Figure 11B:
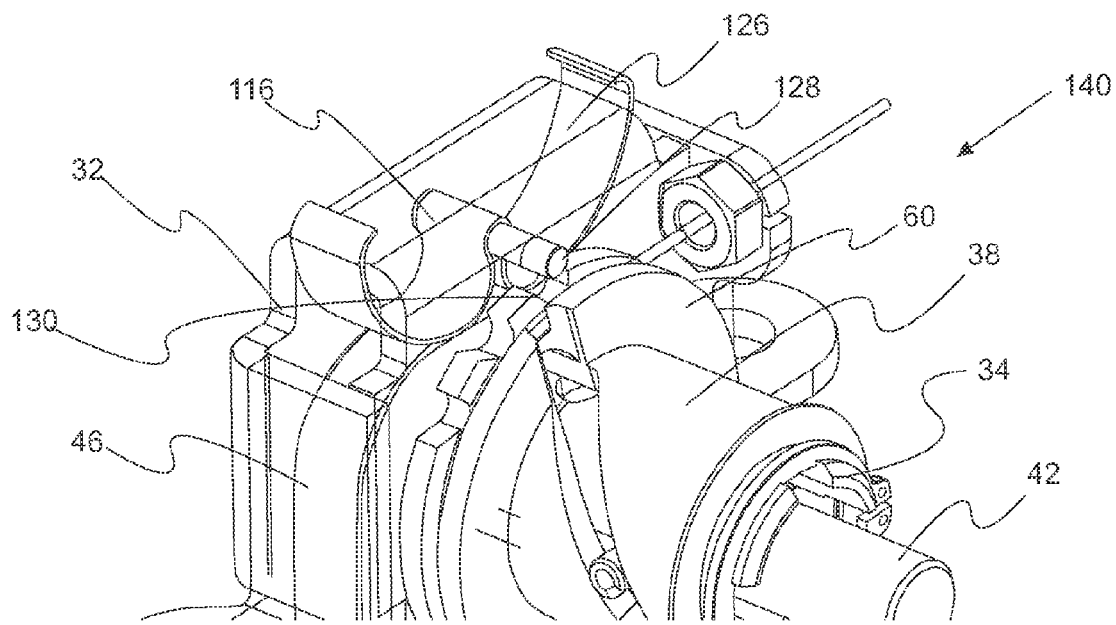
FIG. 11B is a perspective view of a latching system with the blocking component of FIG. 11A in the blocked position.

With reference to FIGS. 11A and 11B, a latching system with another variation of the blocking component is provided. FIG. 11A is a perspective view of a latching system with another variation of the blocking component in the unblocked position. FIG. 11B is a perspective view of a latching system with the blocking component of FIG. 11A in the blocked position. The details of FIGS. 1-10 apply to this variation except as noted. In this variation, latching system 140 includes blocking component 116. Blocking component 116 includes a flat spring 126 and a blocking pin 128 attached to the flat spring. Guide flange section 60 defines at least one notch 130 that engages the blocking pin 128 when the latch pin is in the retracted position. In this variation, flat spring 126 has two ends attached to housing 32 with blocking pin 128 attached at the center of the flat spring. As set forth above, blocking pin 128 impedes rotation of guide flange section 60 and second bushing 38 until engagement with striker 46 moves the guide pin out of notch 130.

Figure 12:
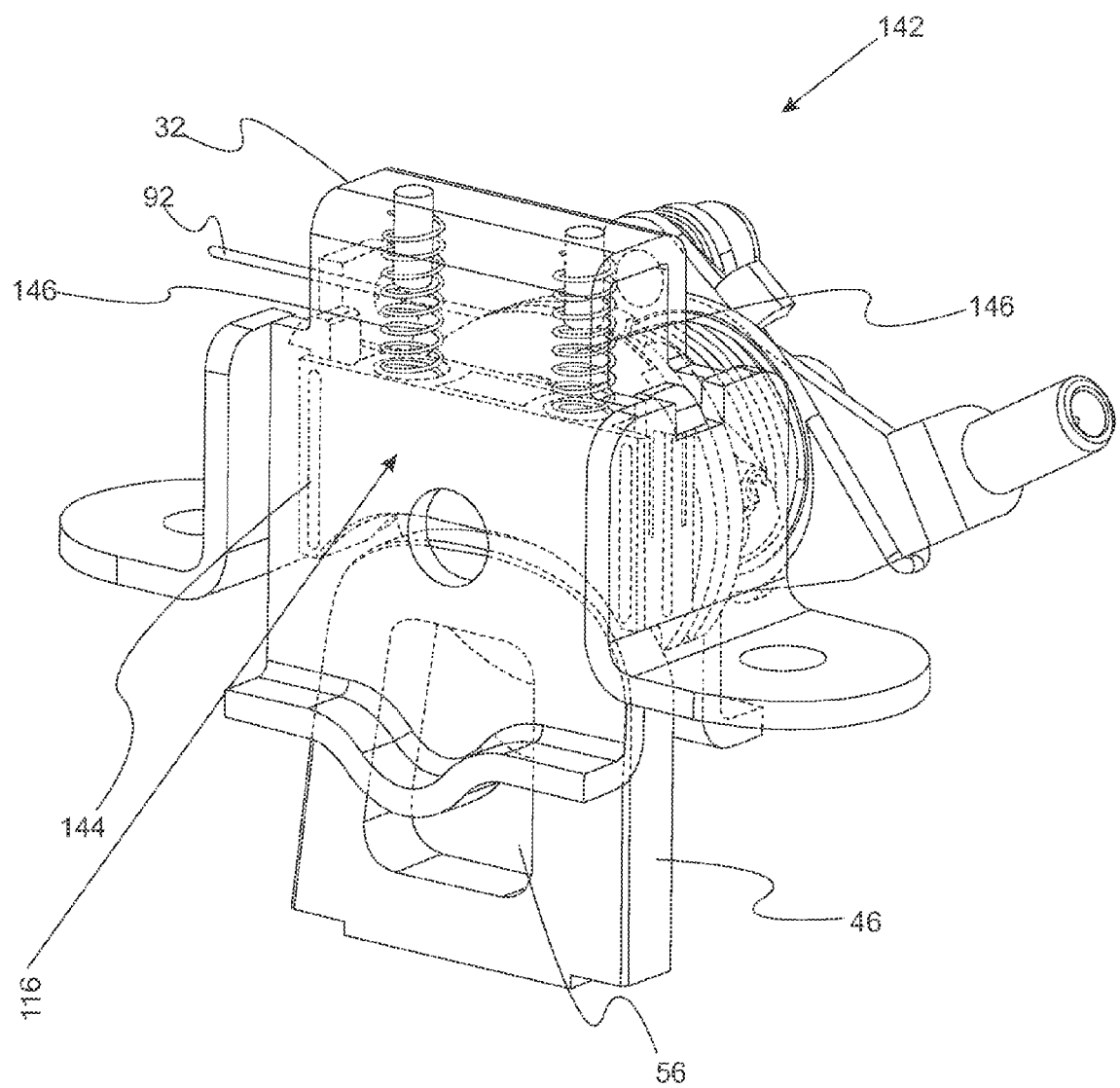
FIG. 12 is a perspective view of a latching system with yet another variation of the blocking component.

With reference to FIG. 12, a latching system with another variation of the blocking component is provided. FIG. 12 is a perspective view of a latching system with yet another variation of the blocking component. The details of FIGS. 1-11 apply to this variation except as noted. In this variation, latching system 142 includes blocking component 116. Blocking component 116 includes a plunger section 144 that is biased to the blocking position by a pair of springs 146.

Figure 13A:
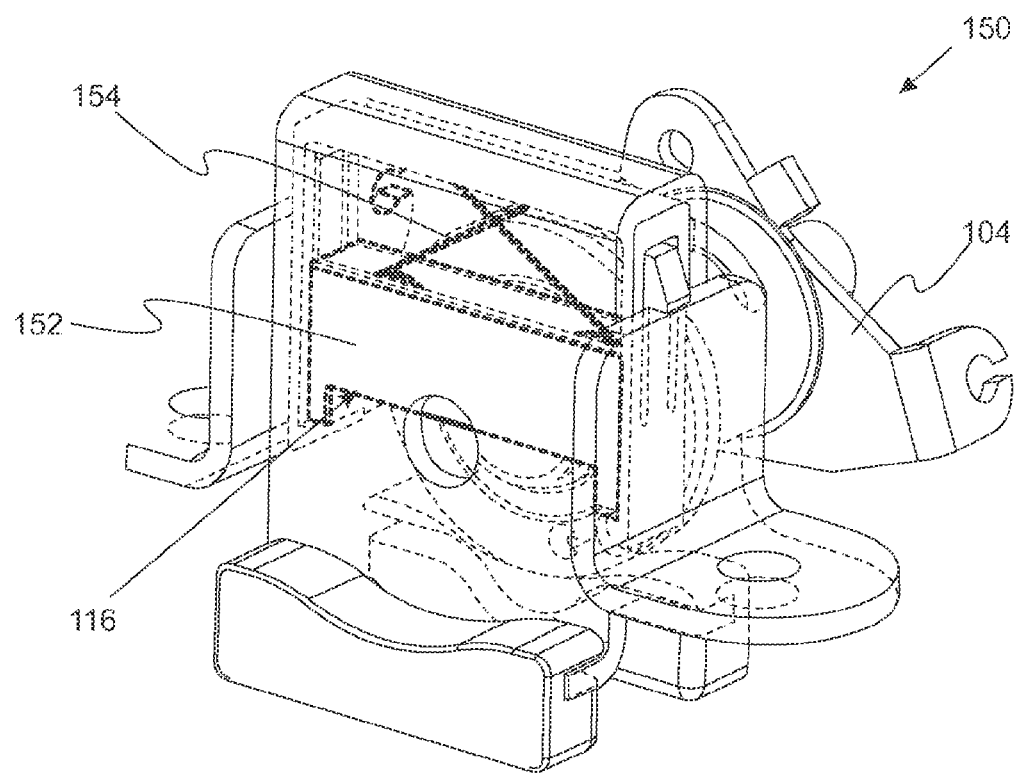
FIG. 13A is a rear perspective view of a latching system with yet another variation of the blocking component.
Figure 13B:
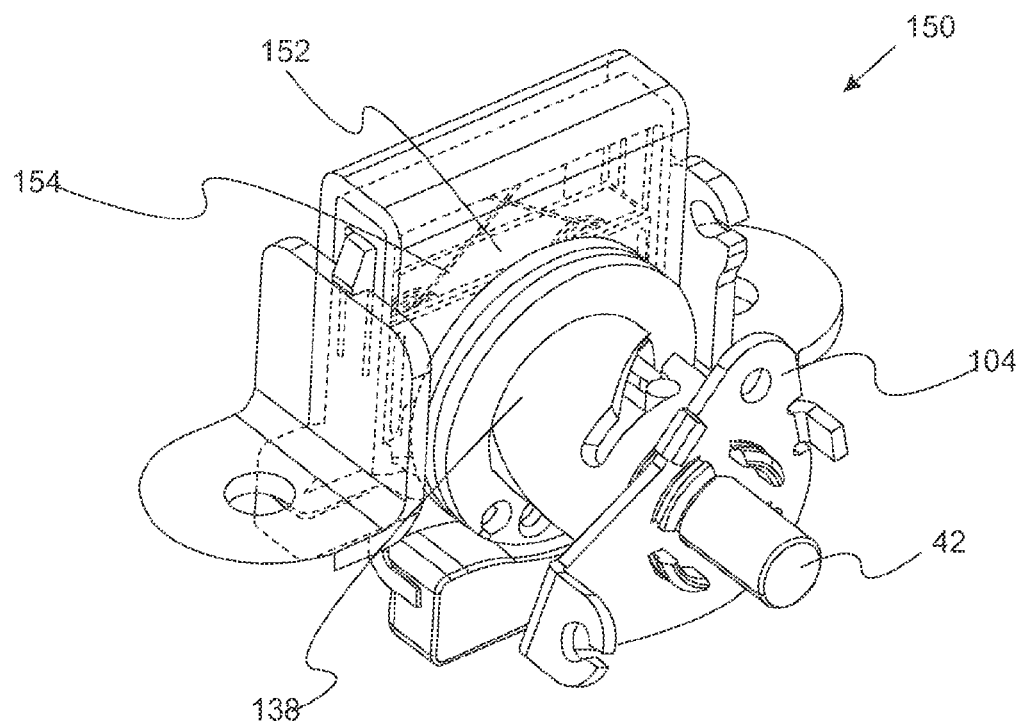
FIG. 13B is a front perspective view of a latching system with yet another variation of the blocking component.

With reference to FIGS. 13A and 13B, a latching system with another variation of the blocking component is provided. FIG. 13A is a rear perspective view of a latching system with yet another variation of the blocking component. FIG. 13B is a front perspective view of a latching system with yet another variation of the blocking component. The details of FIGS. 1-12 apply to this variation except as noted. In this variation, latching system 150 includes blocking component 116. Blocking component 116 includes a plunger section 152 that is biased to the blocking position by a single spring 154.

Figure 14A:
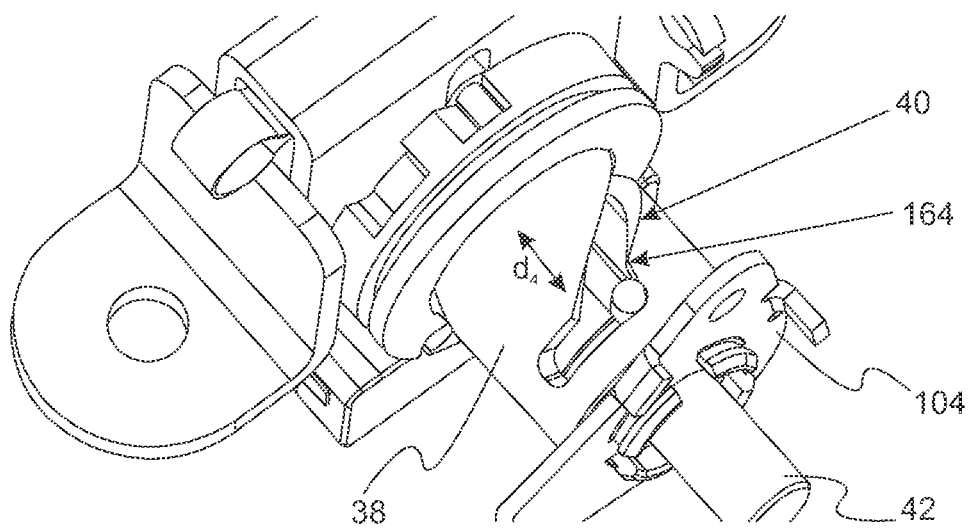
FIG. 14A is a top perspective view of a latching system using an adjustment spring.
Figure 14B:
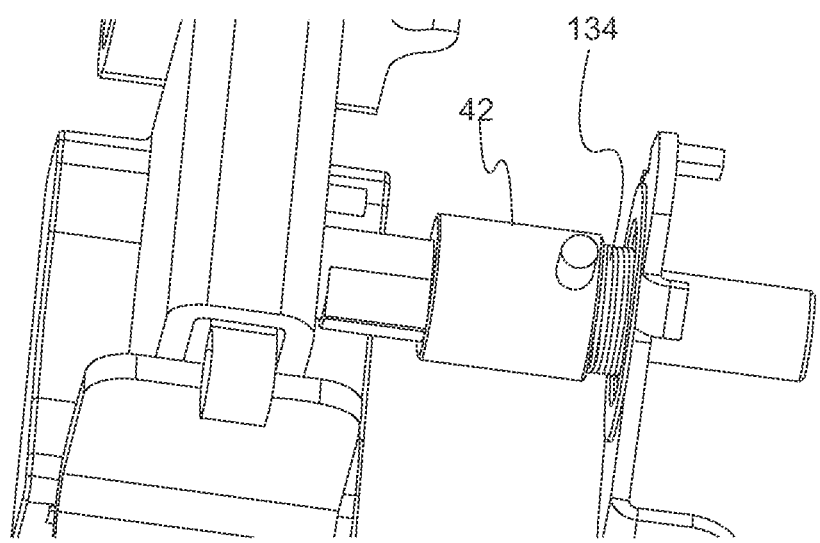
FIG. 14B is a top perspective view of a latching system using an adjustment spring.

With reference to FIGS. 14A and 14B, perspective views illustrating a variation of the operation of an adjustment spring are provided. FIG. 14A is a top perspective view of a latching system using an adjustment spring. FIG. 14B is a top perspective view of a latching system using an adjustment spring. The details of FIGS. 1-13 apply to this variation except as noted. Second guiding groove system 40 includes an adjustment region 164 in addition to the first pair of diagonal groove sections angled with a first angle with respect to a rotation axis for second bushing 38 and the second pair of diagonal groove sections angled with a second angle with respect to the rotation axis for second bushing 38. As set forth above, adjustment spring 134 allows for adjustment of latch pin 42 should the shaft make an improper contact with striker 46. For example, if striker 46 is not completely positioned for engagement, latch pin 42 might strike the top of striker 46. In this event, adjustment spring 134 allows for the flexibility of latch pin 42 to back off along direction $d_4$.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. A latching system for a vehicle seat comprising:
 a latching component mountable on a vehicle seat component, the latching component comprising:
  a housing for mounting the latching component;
  a first bushing attached to the housing, the first bushing having a first guiding groove system;
  a second bushing having a second guiding groove system, the second bushing positioned over the first bushing;
 a striker mountable on a vehicle component, the striker having a slot;

a latch pin having a guide pin, the latch pin positioned within the second bushing such that the guide pin is positioned within the first guiding groove system and the second guiding groove system wherein rotation of the second bushing causes movement of the latch pin between an extended position and a retracted position via motion of the guide pin, the latch pin engaging the slot of the striker at the extended position wherein the second bushing has a guide flange section defining a guiding groove, the guiding groove receiving an actuating cable which is user operated to disengage the latch pin from the striker; and a torsion spring that biases the latch pin to the extended position.

2. The latching system of claim 1 wherein the first guiding groove system and the second guiding groove system each independently have a first pair of diagonal groove sections angled with a first angle with respect to a rotation axis for the second bushing.

3. The latching system of claim 2 wherein the first guiding groove system and the second guiding groove system each independently have a second pair of diagonal groove sections angled with a second angle with respect to the rotation axis for the second bushing, the second angle being greater than the first angle.

4. The latching system of claim 3 wherein the first angle is from 0 to 50 degrees and the second angle from 70 to 90 degrees.

5. The latching system of claim 1 wherein the torsion spring has a first spring end fixed relative to the first bushing and a second end fixed to the second bushing.

6. The latching system of claim 1 further comprising a blocking component positionable in a blocking position that blocks the latch pin from moving to the extended position and a retracted position that allows the latch pin to move to the extended position, wherein the blocking component is moved from the blocking position to the retracted position by engagement with the striker.

7. The latching system of claim 6 wherein the blocking component is a flat spring attached to the housing.

8. The latching system of claim 7 wherein the flat spring has a blocking pin attached thereto.

9. The latching system of claim 8 wherein the guiding flange section defines at least one notch that engages the blocking pin when the latch pin is in the retracted position.

10. The latching system of claim 6 wherein the blocking component includes a plunger section that is biased to a blocking position by at least one spring.

11. The latching system of claim 1 further comprising a stop component comprising:

a mount attached to the second bushing;

an arm rotatably attached to the mount; and a recliner cable attached to the arm such that the arm blocks the latch pin from moving to the retracted position when the latch pin is in the extended position, the arm contacting the latch pin when the latch pin is in the retracted position thereby preventing actuation of a vehicle seat to a recliner position.

* * * * *